(12) United States Patent
Nikittin

(10) Patent No.: US 8,481,918 B2
(45) Date of Patent: *Jul. 9, 2013

(54) SYSTEM AND METHOD FOR IMPROVING THE QUALITY OF THERMAL IMAGES

(75) Inventor: Alex Sasha Nikittin, San Jose, CA (US)

(73) Assignee: Fluke Corporation, Everett, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/436,770

(22) Filed: Mar. 30, 2012

(65) Prior Publication Data

US 2012/0194711 A1    Aug. 2, 2012

Related U.S. Application Data

(63) Continuation of application No. 12/343,286, filed on Dec. 23, 2008, now Pat. No. 8,158,928.

(51) Int. Cl.
*G01D 18/00*    (2006.01)
(52) U.S. Cl.
USPC ................................................. 250/252.1

(58) Field of Classification Search
USPC ............................................... 250/252.1
See application file for complete search history.

(56) References Cited

U.S. PATENT DOCUMENTS

| | | | |
|---|---|---|---|
| 5,903,659 A * | 5/1999 | Kilgore | 382/103 |
| 6,686,961 B1 | 2/2004 | Kubo et al. | |
| 6,690,817 B1 | 2/2004 | Cabib et al. | |
| 2002/0159101 A1 | 10/2002 | Alderson et al. | |
| 2007/0184373 A1 | 8/2007 | Mertens | |
| 2008/0056606 A1 * | 3/2008 | Kilgore | 382/275 |
| 2008/0166061 A1 * | 7/2008 | Hohenberger et al. | 382/254 |
| 2009/0257679 A1 * | 10/2009 | Hogasten | 382/275 |
| 2009/0272888 A1 | 11/2009 | Nugent et al. | |

* cited by examiner

*Primary Examiner* — Marcus Taningco
(74) *Attorney, Agent, or Firm* — Perkins Coie LLP

(57) ABSTRACT

An image improvement system and method are disclosed that compensates for effects of optical scattering and pixel crosstalk on image quality in an imager employing a focal plane array. The method characterizes these effects on a test image, presents them as a set of stored numerical coefficients, and applies the coefficients during image processing.

41 Claims, 8 Drawing Sheets

SYSTEM AND METHOD FOR IMPROVING THE QUALITY OF THERMAL IMAGES

CROSS-REFERENCE TO RELATED APPLICATION(S)

This patent application is a continuation of U.S. patent application Ser. No. 12/343,286, filed on Dec. 23, 2008, entitled "System And Method For Improving The Quality Of Thermal Images," which is incorporated herein in its entirety by reference.

TECHNICAL FIELD

The present disclosure relates to calibrating a thermal imager that uses a focal plane array to compensate for effects of optical scattering and pixel cross-talk on image quality.

BACKGROUND

The measured optical resolution of infrared radiometry images is generally known to be degraded as compared to theoretical values. The degradation can be caused by light scattering in the optical system. Typically, an imager uses an array of light sensing pixels called a focal plane array that is positioned at or near the focal plane of the optical system of the imager in order to image a subject. However, pixel cross-talk which results in unwanted coupling of energy between pixels can occur that has optical, thermal, and/or electrical origins, thus contributing to the degradation of the measured image.

Digital image processing uses algorithms to perform image processing on pixel values of digital images. One type of image processing algorithm performs spatial filtering where the algorithm is intended to identify pixels in a digital image at which the image brightness has gradients. In one technique, a spatial filter is applied to an image in order to enhance contrast at the edges of objects within the image, while still preserving the important structural properties of an image. However, application of edge enhancement algorithms alone to radiometry images would distort radiometric properties of the acquired thermal images without further information about the source of the image degradation.

SUMMARY

An image improvement system and method are disclosed that compensates for the effects of optical scattering and pixel cross-talk on radiometric or photometric image quality in an imager employing a focal plane array. These effects are characterized on a test image and then presented as an individual set of numerical coefficients to be stored in the instrument for use as a correction filter for image processing. Each instrument ideally has its own customized correction filter. By applying the individually pre-determined correction filter, object edge contrast is enhanced by a measured amount, such that the image radiometrically improves around the edges. As a result, the distance to spot ratio of the imaging instrument is significantly improved, especially when characterized at higher energy levels which is necessary for higher accuracy applications.

BRIEF DESCRIPTION OF THE DRAWINGS

Examples of a radiometric image improvement system and method are illustrated in the figures. The examples and figures are illustrative rather than limiting.

DETAILED DESCRIPTION

Figure 1A:
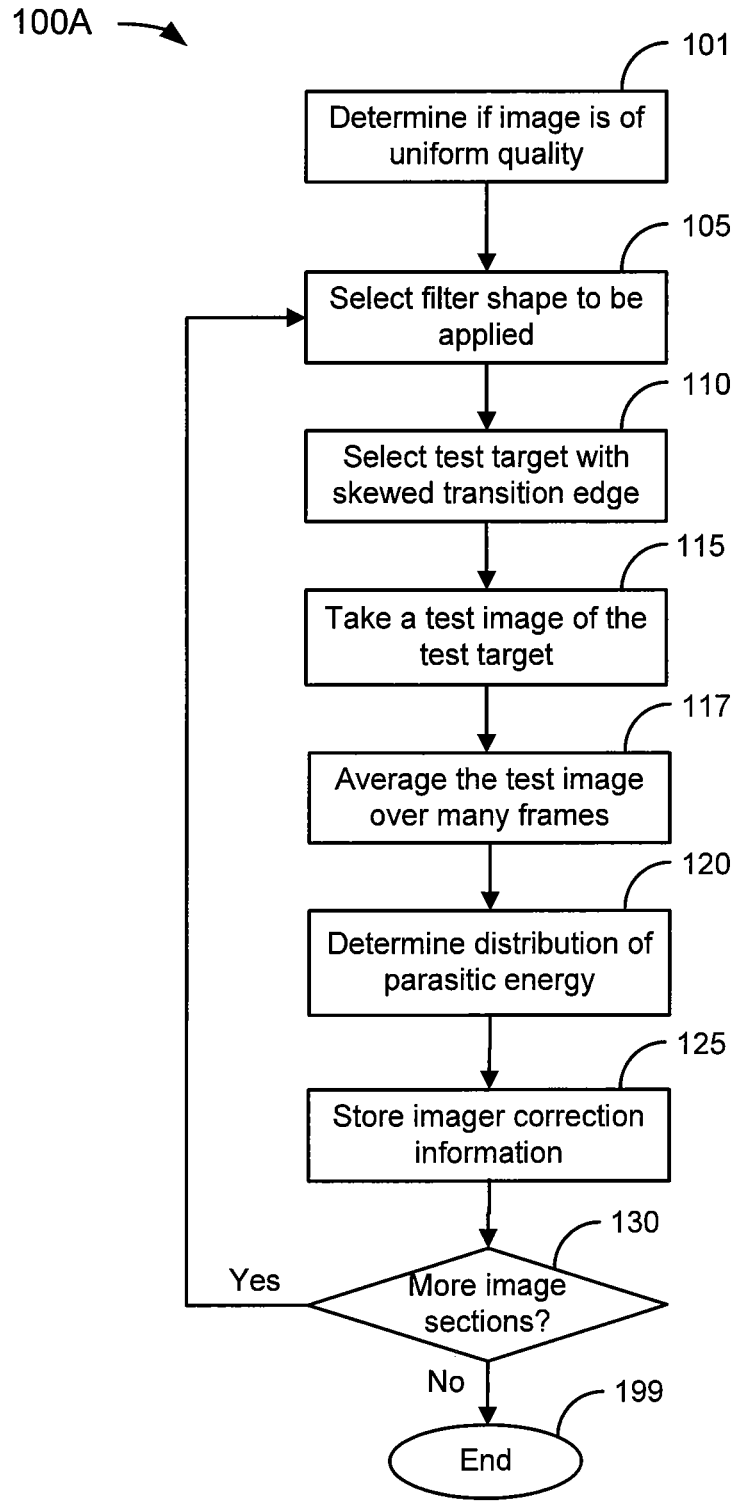
FIG. 1A depicts a flow diagram illustrating an exemplary filter generation process, according to an embodiment of the disclosure.

Described in detail below is a method and apparatus for improving the image quality of an imaging instrument that uses a focal plane array. The distribution of parasitic energy within a defined neighborhood around a pixel is determined in order to generate a spatial correction filter made up of a matrix of coefficients. This filter is then applied to each pixel in the image to improve the accuracy of the energy readings, where the calculated parasitic energy from each pixel signal is subtracted, as expressed in radiance units, prior to conversion to temperature values.

The following description and drawings are illustrative and are not to be construed as limiting. Numerous specific details are described to provide a thorough understanding of the disclosure. However, in certain instances, well-known or conventional details are not described in order to avoid obscuring the description.

Without intent to further limit the scope of the disclosure, examples of instruments, apparatus, methods and their related results according to the embodiments of the present disclosure are given below. Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

Generally, radiometric and photometric imagers tend to produce images that have imperfections arising from the optics and/or electronics of the imager. For example, when there is a step transition between a first level of illumination and a second level of illumination in a target to be imaged, the resulting image can have some blurring due to optical scattering and also time-domain signal transfer caused by latency in front-end electronics that is dependent upon the sampling rate. The techniques for correction described below can be applied to any imaging instrument operating at any imaging wavelength.

Typically, the optical system of a thermal imaging instrument collects infrared energy from a round measurement spot and focuses it on a detector. Optical resolution is the ratio of the distance from the instrument to the object to be measured, compared to the size of the spot being measured (D:S ratio). For example, a D:S of 20:1 means that at a distance of 20 cm, the spot size of the instrument is 1 cm. Thus, for a given distance between an imaging instrument and the target to be imaged, the higher the optical resolution of the instrument, the smaller the spot size, and the spot size must be smaller than the object to be measured in order to perform an accurate measurement.

The common working wavelength range for radiometric imagers is between eight and fourteen microns because these wavelengths fall within an atmospheric transmission window. However, any appropriate measurement wavelength may be used. Traditionally, thermal imaging instruments that can measure 90% of the energy have a 10% error when expressed in energy units, and this corresponds to approximately a 6% error when expressed in temperature units. If a thermal imaging instrument is needed that has a better temperature accuracy, it is necessary to measure a correspondingly greater percentage of the energy with the imaging instrument. For example, a measurement of 1% accuracy in the temperature reading would require the imaging instrument to measure 98.4% of the actual energy. Generally, a measurement of 100% of the energy is defined for a particular calibration geometry where the instrument is supposed to be accurate, but if the instrument is moved farther away from a target of a given size (large D:S), less energy is collected, and the temperature reading will become more inaccurate.

The negative effects of optical scattering and pixel crosstalk degrade radiometric or photometric image quality. Typically, the effects of optical scattering are seen with sharp edge transitions at the highest levels of measured energy. Thus, the correction of images produced by an imaging instrument involves the use of a target image that has at least one sharp transition edge between uniformly illuminated areas having different illuminations. The goal of the analysis is to determine the distribution of parasitic energy within a neighborhood around each pixel.

FIG. 1A depicts a flow diagram illustrating an exemplary filter generation process 100A for generating a spatial correction filter for the images generated by an imaging instrument. The filter generation process 100A is generally performed prior to the initial use of the imager by an instrument filter designer. However, the filter generation process 100A may be performed at any time during the life of the imager instrument. Typically, the process 100A occurs at the instrument factory prior to delivery to an end user. Once the correction coefficients for the filter have been determined by the process 100A, these parameters can be stored and applied to each subsequent image taken by the imager.

At block 101, the images produced by the imager are evaluated by the filter designer to determine whether the imager produces images of uniform quality and with fairly uniform scattering properties. If the image quality and the scatter distribution are sufficiently uniform across the entire image, a single filter can be generated and then applied to process all images from that imager to improve the radiometric quality, where the coefficients of the filter are obtained by using a single scattering function. However, if the properties of the images produced by the imager change from one section of an image to another section, then the applied filter should also change correspondingly in order to accurately process the different sections of the image. An imager that uses a wide angle lens would be one non-limiting example where an image would be generated with sections having different properties. The central portion of the image would have different properties from the peripheral portion of the image. For each region of the image to which a particular filter is applied, however, it is assumed that within that region, the image quality and scattering are fairly uniform.

Figure 2:
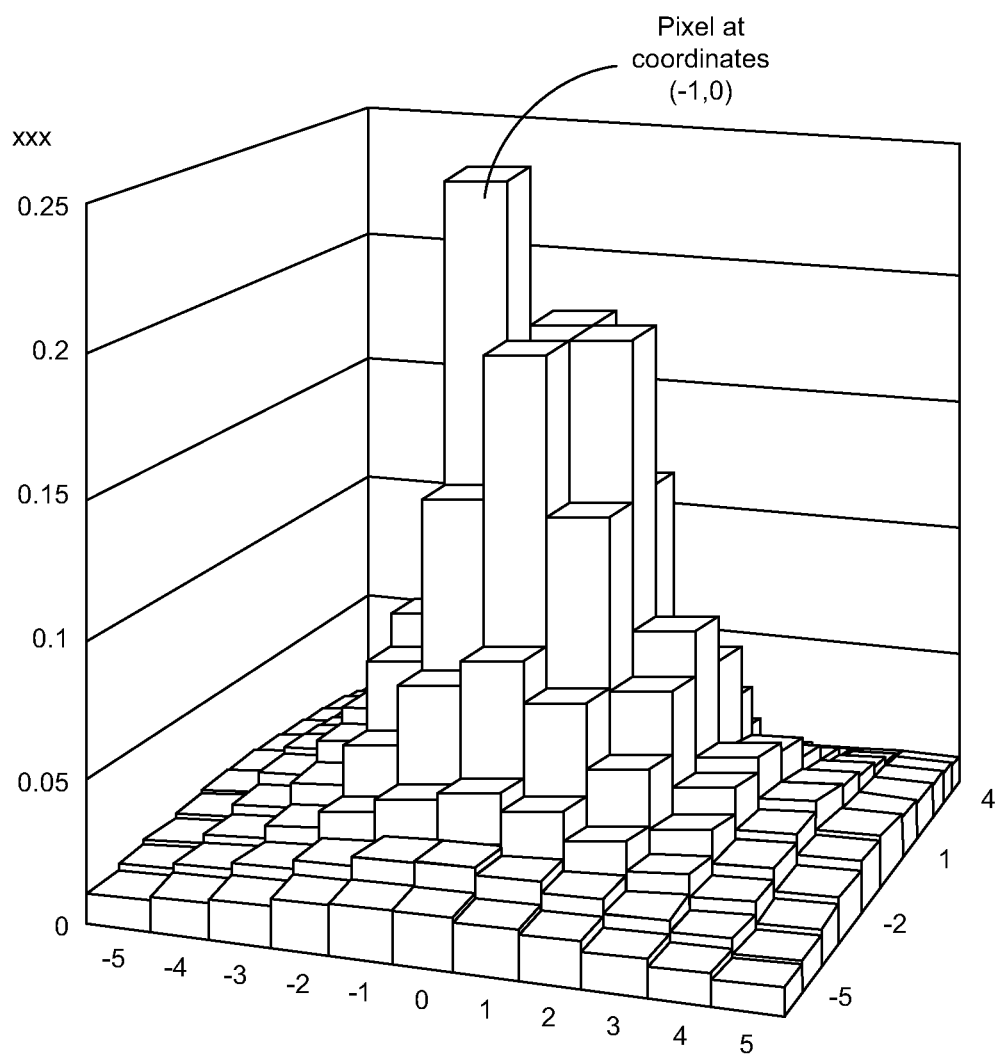
FIG. 2 is a graphical representation of an example correction filter that has been determined to represent the influence of neighboring pixels on a central pixel for a particular imaging instrument.

FIG. 2 is a graphical representation of an example filter 200 comprising a matrix of coefficients that have been determined to represent the influence of neighboring pixels on a central pixel for a particular imaging instrument. The central pixel is located at coordinates (0,0).

A single correction filter or a set of correction filters to be applied to specific sections of generated images can be developed and used for a family of imagers that are designed using the same optical system. At block 105 during the filter design stage, the designer selects an optimum filter shape and size for the filter generation process 100A. In general, a circular filter shape would match the shape of the optics used in the imager. However, a square or rectangular shape is generally preferred for reducing processing time. In one embodiment, as shown in FIG. 2, the filter shape can be selected to be a square filter having the same number of pixels on a side; the filter shown in FIG. 2 is 11 pixels long by 11 pixels wide and can be specified in a matrix format for matrix calculations. However, the filter shape can be selected to be any convenient shape and to have any appropriate pixel dimensions.

Figure 3:
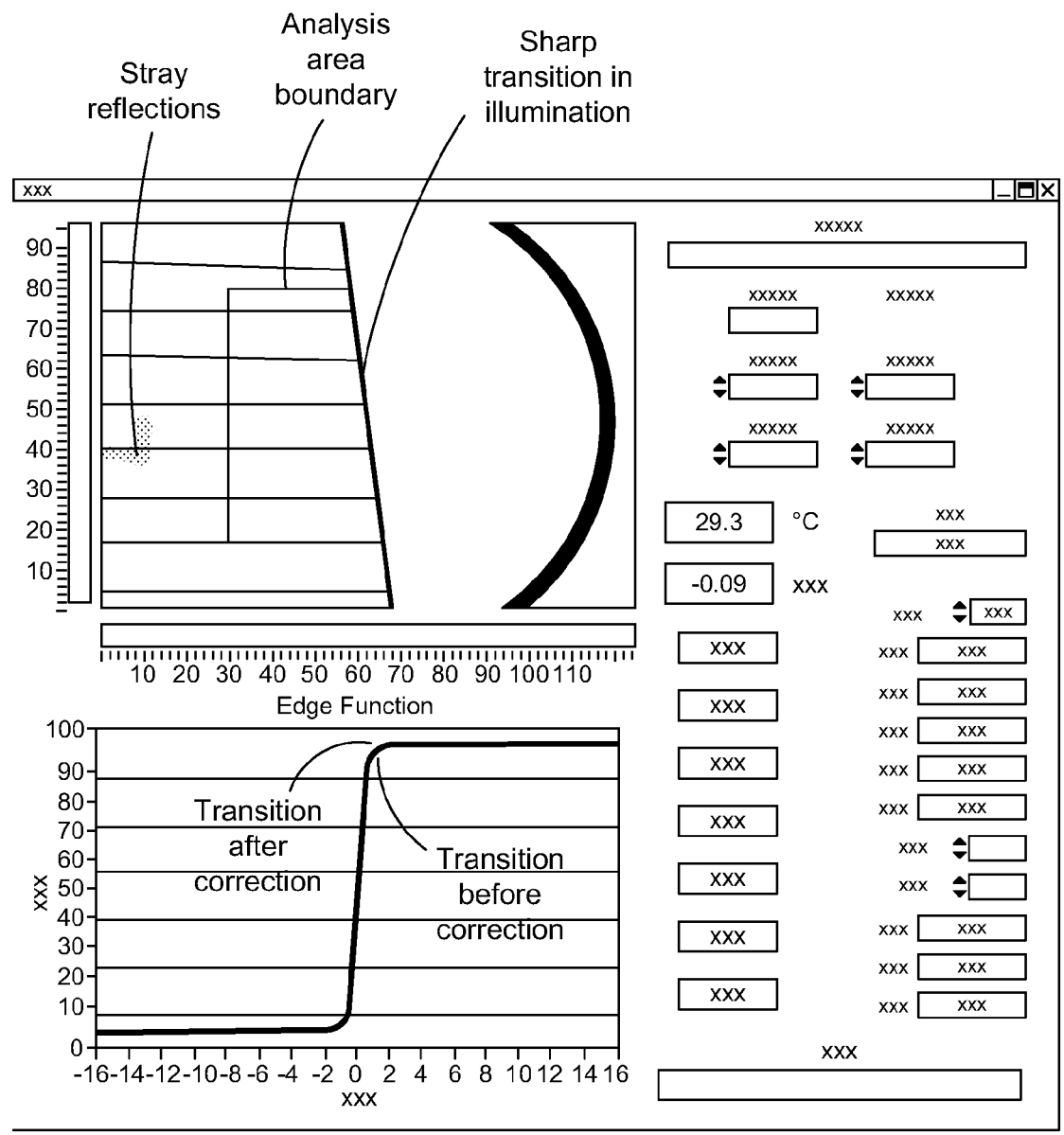
FIG. 3 shows an example of an image taken of a test target and a normalized signal across an edge in the rendered image.

Next, at block 110 the filter designer selects an appropriate test target that has at least one linear transition edge slightly skewed from either a vertical position or a horizontal position, where the transition is between two approximately uniformly illuminated areas having different illuminations. One non-limiting example of an appropriate target is shown at the top of FIG. 3. The target has two uniformly illuminated areas that are white and gray in FIG. 3, and there is a sharp linear transition edge between the two areas. In one embodiment, the illumination source of the target is round, and a portion of the source is covered with a piece of metal, such as aluminum, where the metal provides a darker illumination area as compared to the source. The transition edge between the two areas is at a small angle to the vertical or horizontal, not exactly vertical or horizontal. If the transition edge were perfectly vertical or horizontal, there would only be one transition pixel between the two areas, so it would be difficult to determine how bright the pixel is at the transition edge. However, if the transition edge were skewed at a small angle to the vertical or horizontal, pixel lines (horizontal or vertical, respectively) crossing the transition curve edge would have different geometrical phases relative to a neighboring pixel line.

Although the transition edge should be at a small angle, the angle at which the transition edge is with respect to a vertical or horizontal line is not critical, as long as the transition edge crosses at least one pixel from the top to the bottom of the analysis area if the angle is close to vertical, or from the left to the right of the analysis area if the angle is close to horizontal. An example analysis area is shown by the rectangle in the top picture in FIG. 3. With a transition line close to vertical, the pixels in horizontal rows would be analyzed by the filter designer for optical scattering in the horizontal direction, and with a transition line close to horizontal, the pixels in vertical columns would be analyzed for optical scattering in the vertical direction. If all of the scattering effects to be characterized are isotropic, then only pixels in one direction, either vertical or horizontal, need to be analyzed.

In one embodiment, the scattering in both the horizontal and vertical directions would be characterized to determine if there are any non-isotropic scattering effects.

Next, at block 115, a test image of the test target is taken by the filter designer with the instrument to be calibrated. Because the test image is static, multiple images, even up to 100 or more images, of the target can be taken and then averaged at block 117 in order to reduce noise.

At block 120, the filter designer uses a processor to perform an iterative test calibration to determine the distribution of parasitic energy within an analysis area by determining the characteristic equations for scattering and other optical and/or electronic effects and then curve fitting the test data to the equations.

A few assumptions are made during the analysis and determination of the distribution of parasitic energy at block 120. The first assumption is that in order to correct an image, each pixel in a captured image receives parasitic energy from its neighboring pixels, and the parasitic energy is proportional to a difference in illumination between the first pixel and the neighboring pixel with the parasitic energy. This implies that the response of the imaging system to brightness levels and changes in brightness levels are relative, not absolute.

Alternatively, a non-linear distribution of brightness could be accounted for by applying a correction filter as a function of the percent change in brightness between pixels. This correction would be applied to the energy levels of a captured image prior to conversion to temperature values because the conversion of the received energy by the imaging instrument to temperature is also non-linear.

Figure 4:
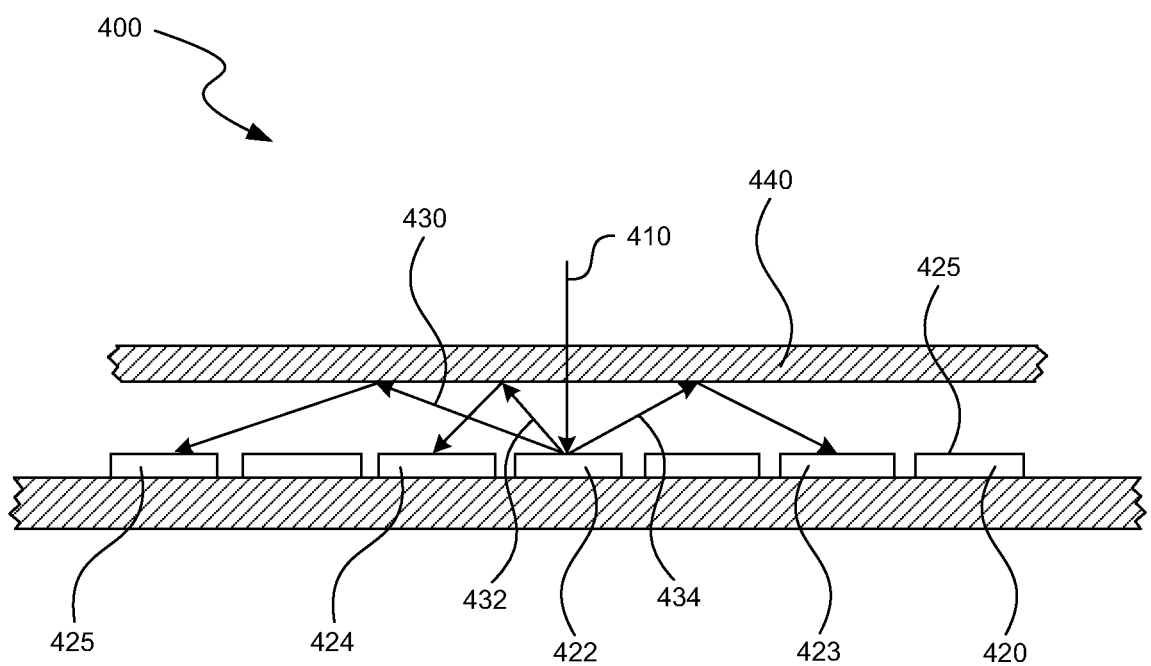
FIG. 4 shows an example of the $1/D^2$ scattering dependence arising from scattering and reflections within a focal plane array.

The next assumption is that the parasitic energy distribution arises primarily from isotropic scattering, where the parasitic energy is transferred equally in all directions and is reduced as a function of distance from the influencing pixel to the pixel receiving the parasitic energy. FIG. 4 shows an example of a $1/D^2$ scattering dependence, where D is the distance from the center pixel 422 to one of the neighboring pixels, for example pixel 424. The isotropic scattering is caused by reflections from the focal plane array window on each of the pixels, for example window 425 on pixel 420. Thus, the light 410 entering the focal plane array of the imaging instrument would all be detected by pixel 422 if there were no scattering caused by non-specular reflections. However, as an example, scattering of light 410 occurs off of the window of pixel 422. Because the actual scattering is difficult to measure, empirical data is used to determine the scattering dependency, and the scattering mechanism was found to closely follow a $1/D^2$ scattering dependence, as illustrated in FIG. 4. Reflection 434 reflects off the inside covering window 440 of the focal plane array and is captured by pixel 423, reflection 432 reflects off window 440 and is captured by pixel 424, and reflection 430 is reflection off window 440 and is captured by pixel 425. The closer a neighboring pixel is to the center pixel, where the light first impinges, the more energy that neighboring pixel will receive. One reason that the $1/D^2$ scattering dependence characterizes the scattering so well is that covering window 440 is so close to the pixels. Although the $1/D^2$ scattering dependence has been found to characterize the scatter in the focal plane array of the imaging instrument well, other scattering functions may also be used to characterize the scattering, for example higher-order inverse polynomial functions.

During the determination of the coefficients by the filter designer, the actual averaged image pixel data calculated at block 117 is curve fit to the chosen scattering dependence. Curve fitting is performed over a selected analysis area. The sharp transition edge or edges should completely cross the analysis area. Also, the analysis area should be significantly larger than the selected filter size. Further, the analysis area should be representative of the filter application area, while test target quality should be substantially uniform across the analysis area. One example of an analysis area is the faint rectangle shown in the top of FIG. 3. Note that the analysis area boundary in FIG. 3 is not near the non-uniform round edge of the source, nor is it near the stray reflections on the left of this figure.

There may also be another form of parasitic energy distribution based upon time-domain signal transfer during sampling of the image focal plane array by the, where the parasitic energy is a portion of the signal change from the brightness level of a previous pixel. The time-domain signal transfer is caused by latency in front-end electronics and depends upon the sampling rate. Thus, for a very slow sampling rate, the latency in the electronics would not be evident, and no parasitic energy distribution component would arise from this source. However, a typical sampling rate is sufficiently fast that a noticeable non-isotropic contribution arises from the electronics that corresponds to the scanning direction. When pixels in an image are scanned by the focal plane array, only the pixels that precede a particular pixel in order and time of scanning will contribute to the brightness of that particular pixel when correcting an image. The line of pixels above and below that particular pixel will have very low to negligible contributions that are not accounted for here. Based upon empirical data arising from the electronics in the imaging system, the filter designer selects an appropriate equation that describes the data, similar to the process for determining the scattering dependency described above. Then, the actual averaged image data calculated at block 117 is used to curve fit to a selected time domain signal transfer equation. In one embodiment, the curve fitting to the data for the scattering dependency and time domain signal transfer equations can be done simultaneously, rather than sequentially.

In order to capture non-isotropic parasitic energy distribution, a target having two sharp transition edges, one close a vertical position and one close to a horizontal position, can be used. Scattering in the horizontal direction is determined by analyzing the pixels in horizontal lines across a nearly vertical transition edge, and scattering in the vertical direction is determined by analyzing the pixels in vertical lines across a nearly horizontal transition edge.

Figure 1B:
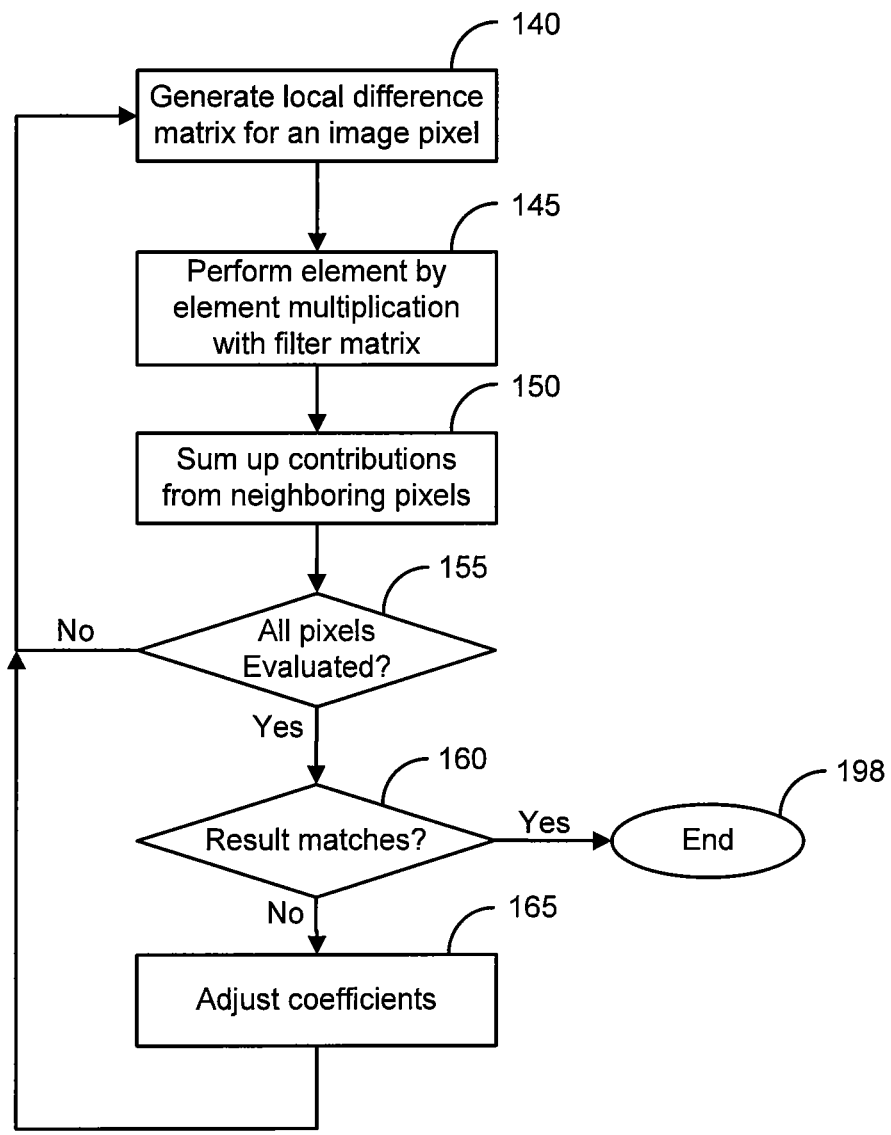
FIG. 1B depicts a flow diagram illustrating an exemplary iterative test calibration process, according to an embodiment of the disclosure.

The details for performing the test calibration of block 120 in FIG. 1A are shown in test calibration process 100B in FIG. 1B. At block 140, the processor generates a local difference matrix for a particular image pixel, where the local difference matrix has the same dimensions as the filter selected at block 105. Typically, the local difference matrix will be centered around the particular image pixel being analyzed. Because the test target used to generate the image has only two illumination levels, level 1 and level 2 which are both known, there will only be two numerical values within the local difference matrix for each image pixel, namely, (pixel brightness—level 1) and (pixel brightness—level 2).

At block 145, the processor performs an element by element matrix multiplication using the local difference matrix calculated at block 140 and a correction filter. The determination of the coefficients for the correction filter is an iterative process. The first time a correction filter is used, a standard or arbitrary starting correction filter can be used that is subsequently adjusted upon future iterations. The contribution from each of the neighboring pixels, as determined at block 145, is then summed up at block 150. The sum of the contributions from the neighboring pixels is associated with the image pixel for future matrix for operations.

At decision block 155, the processor decides if the blocks 140, 145, and 150 have been executed for all pixels within the analysis area. If generation of the local difference matrix, element by element matrix multiplication, and summation of contributions from neighboring pixels have not been executed for all pixels (block 155—No), the process returns to block 140 where a local difference matrix is generated for another pixel in the analysis area. If the steps have been performed for all pixels in the analysis area (block 155—Yes), the process continues to decision block 160.

At decision block 160, the processor decides if the sum of the contributions from block 150 matches the local difference matrix from block 140. If the matrices match (block 160—Yes), the filter coefficients are stored at block 165. The matrix of filter coefficients that were determined for the imaging instrument is stored in memory for use in processing subsequent images taken by that imager. The matrix of coefficients can be stored in memory at the imaging instrument or in memory at an external computer for post-processing of images. Because the matrix of coefficients is particular to the imager, the coefficients should be stored with the images for post-processing. The process ends at block 198.

If the matrices do not match (block 160—No), at block 165, the coefficients in the filter matrix are adjusted by the processor according to the filter designer's instructions. Then the process returns to block 140 where a local difference matrix is generated for a pixel in the analysis area, and the iterative process continues. The iterative process implements the curve fitting of the test data to the characteristic equations described above.

The iterative test calibration determines the appropriate numerical coefficients to use to correct the sharpness of a transition edge in the image so that it is as close as possible to the theoretical step response. If the brightness of the image is uniform, then the local difference matrix will be a null matrix, and the correction filter will have no impact. Then the filter designer attempts to adjust the numerical coefficients iteratively.

Referring to filter 200 in FIG. 2, notice that except for the pixel located at coordinates (−1,0), the filter is symmetrical around the central pixel, indicating that the scattering mechanism is isotropic. The asymmetrical contribution from the pixel at (−1,0) arises from the time domain signal transfer of the electronics, as discussed above. Thus, the focal plane array was scanned from left to right, and the pixel at (−1,0) was the pixel scanned immediately prior to the central pixel at (0,0).

Returning to the filter generation process 100A, at block 125 in FIG. 1A the different correction zones, if any, of the generated images, the filter dimensions (size and shape) for each filter for the individual correction zones, and the particular equations are stored. These stored parameters can be used to generate the numerical coefficients for the individual filters at any time during the life of the imaging instrument. However, typically the filters can be generated and stored at the factory in memory within the imaging instrument or within an external image processor.

At decision block 130, the designer decides whether there are any other image sections for the particular imager for which a filter needs to be designed. If there is another section (block 130—Yes), the process returns to block 105 where the designer selects an appropriate filter shape. If the image sections each have a corresponding correction filter already designed (block 130—No), the process ends at block 199.

Figure 5:
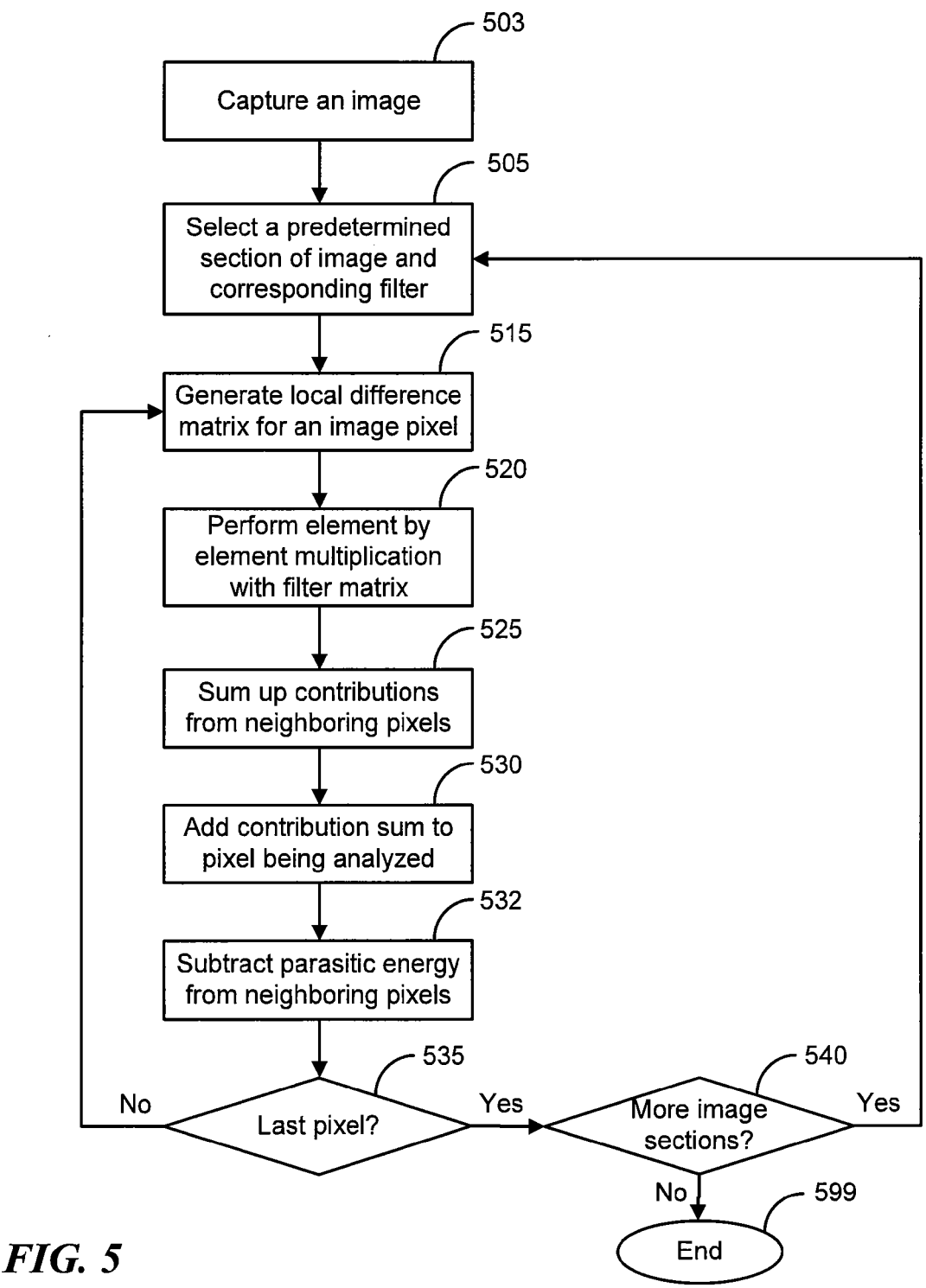
FIG. 5 depicts a flow diagram illustrating an exemplary image correction process for applying a matrix of correction coefficients as a spatial correction filter, according to an embodiment of the disclosure.

FIG. 5 depicts a flow diagram illustrating an exemplary correction process 500 for applying a matrix of correction coefficients as a spatial correction filter to an image, according to an embodiment of the disclosure. The correction filter can be applied to an image either in real time or during post-processing of the image. Further, the correction filter can be performed in the imaging instrument or on an external processor such as a computer.

At block 503, an image is captured using an imaging instrument that has a focal plane array.

Then at block 505, a predetermined section of image is selected along with its corresponding correction filter. If the imager produces fairly uniform images, the imager only has a single correction filter which is applied to the entire image.

For the particular section of the image that is being processed, at block 515 a processor subtracts the brightness of a first pixel from its neighboring pixels in radiance units, before conversion to temperature units. The number of neighboring pixels for which this calculation is performed depends upon the size of the filter that is being applied. For the example, in the filter shown in FIG. 2, the filter is square with 11 pixels on a side. Thus, a square local difference matrix having 11 pixels on a side is calculated at block 515. The center pixel at coordinates (0,0) corresponds to the pixel itself, thus the brightness difference is zero here. The amount of correction to be applied for the filter shown in FIG. 2 is shown on the z-axis.

Alternatively, as described above, a non-linear distribution of brightness could be accounted for by applying a correction as a function of the percent change in brightness between a central pixel and neighboring pixels.

At block 520, an element by element matrix multiplication is performed using the local difference matrix calculated at block 515 and the correction filter determined with the filter generation process 100A and the test calibration process 100B. This technique corrects the sharpness of a transition edge in the image so that it is as close as possible to the theoretical step response. If the brightness of the image is uniform, then the local difference matrix will be a null matrix, and the correction filter will have no impact.

The contribution from each of the neighboring pixels, as determined at block 520, is then summed up at block 525. At block 530, these contributions are added to the central pixel to obtain a corrected brightness. Then at block 532, the contribution of each neighboring pixel to the center pixel is subtracted from the brightness of that particular neighboring pixel in order to obtain the corrected pixel brightness.

The goal of the analysis of correction process 500 is to have the rendering of a sharp transition edge approach an ideal step response. The bottom graph of FIG. 3 shows a transition edge prior to correction which has a noticeably rounded response that is several pixels in width near the 95-100% energy signal range. In contrast, the transition after the correction filter has been applied has a sharper step response in the same energy signal range. As can be seen in this graph, for measurements at lower energy levels, for example 50%, the correction filter does not noticeably improve the image quality. Thus, the correction filter technique is most useful when measuring an image at high energy and high accuracy levels.

At decision block 535, the system determines if there are any pixels within the selected section of the image whose brightness level has not been corrected using the correction filter. If there are more pixels to be processed (block 535—No), the process returns to block 515. If all the pixels in the section have been processed (block 535—Yes), the process continues to decision block 540.

At decision block 540, the system determines if there are any other sections in the image to be processed using a different correction filter. If there is another section (block 540—Yes), the process returns to block 505 to select another image section and the corresponding correction filter. If there are no more unprocessed sections (block 540—No), the process ends at block 599.

Figure 6:
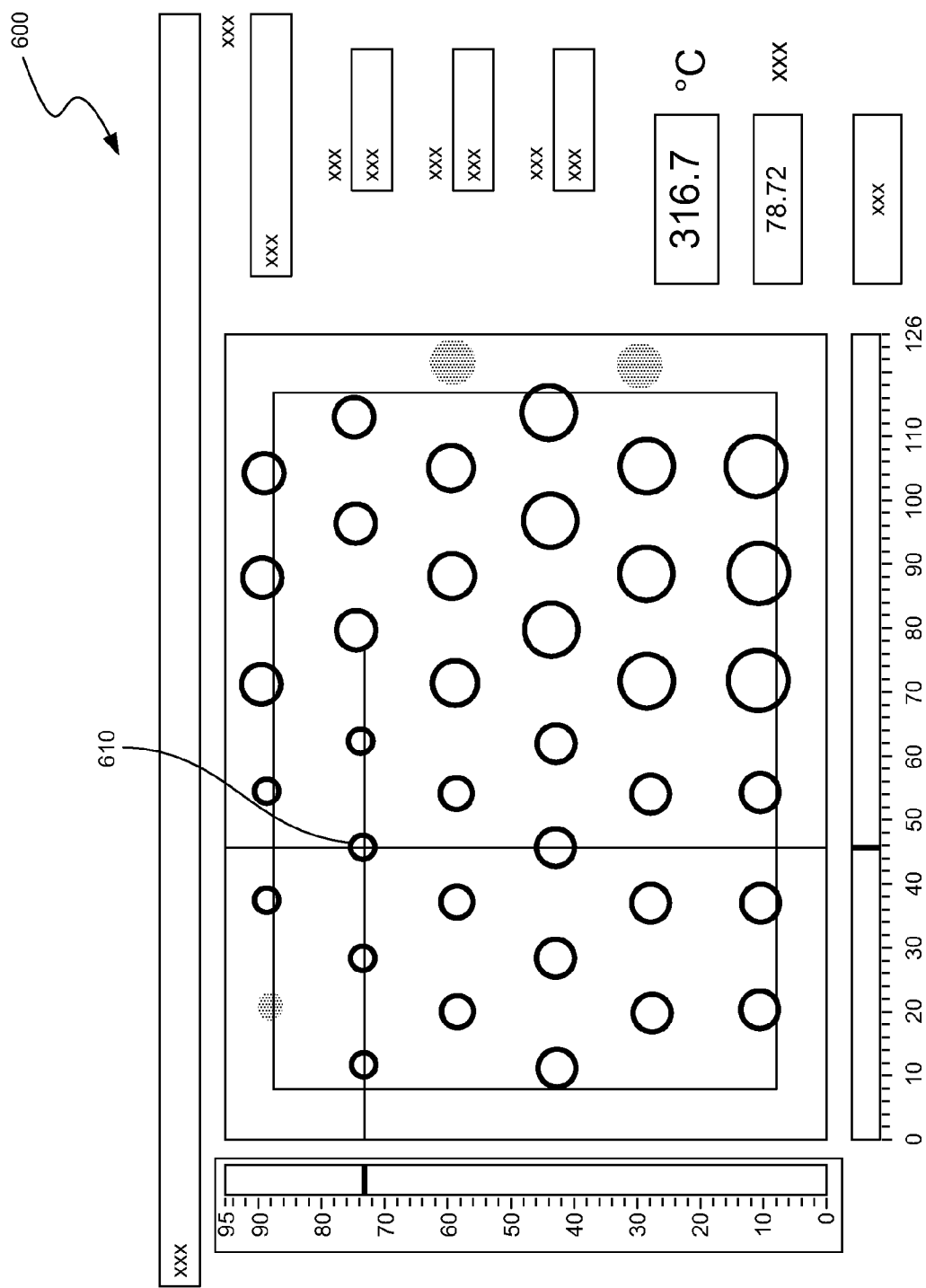
FIG. 6 shows an example of an unprocessed image of a D:S (distance: spot) resolution test plate.

FIG. 6 shows an example of an unprocessed image 600 of a D:S (distance:spot) resolution test plate. The image 600 has been averaged over hundreds of images taken of the test plate in order to get better resolution and decrease the noise. The images have been taken at a fixed distance.

The resolution test plate is made up of holes of different sizes. The larger holes in the test plate have a lower D:S ratio, and the smallest holes have a D:S ratio that is beyond the instrument resolution. The range of D:S ratios present in the resolution test plate allows the quantitative measurement of the improvement in the D:S ratio for an imaging instrument after application of the correction process 500 described above.

In order to quantitatively determine the improvement that the correction filter provides, a temperature measurement can be taken of the uncorrected image of FIG. 6 in a hole that corresponds to a particular D:S ratio, for example 50:1. Then the percent difference in the measured temperature value from the actual temperature of the source is calculated. Next, the temperature is measured in smaller holes in the corrected image that have a higher D:S ratio. By comparing the size of the hole in the corrected image that results in a similar percent difference, an indication of the improvement in D:S ratio can be obtained.

In particular, for the hole 610 located at the cross-hairs in the uncorrected image of FIG. 6, the D:S ratio is 120:1, and the measured temperature was 316.7° C., while the actual background temperature was 330° C., thus resulting in approximately a 4% error in the measured temperature which corresponds to approximately a 6% error in the measured energy. In contrast, for the same hole in an image taken after the correction filter has been applied, the measured temperature increased to 327.2° C., resulting in approximately a 1% temperature reading error, or 1.5% energy error, which is an improvement in temperature measurement accuracy on a small object, such as the hole 610.

Figure 7A:
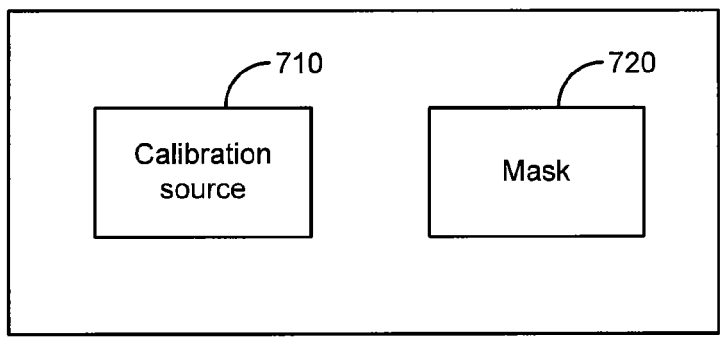
FIG. 7A shows a block diagram of an example test target system used to calibrate an imaging instrument.

FIG. 7A shows a block diagram 700A of an example test target used to correct an imaging instrument. A test target can include a calibration source 710 and a mask 720.

The calibration source 710 should have a substantially uniform temperature across its surface. One non-limiting example of a calibration source is a plate source produced by Hart Scientific, a division of Fluke of Everett, Wash. The plate source can be round, square, or any other shape. The mask 720 is placed in front of the calibration source 710 in order to provide one or more sharp transition edges. Masks can be made from aluminum or any other suitable material. Further, the mask should be tilted at a small angle from vertical or horizontal.

Figure 7B:
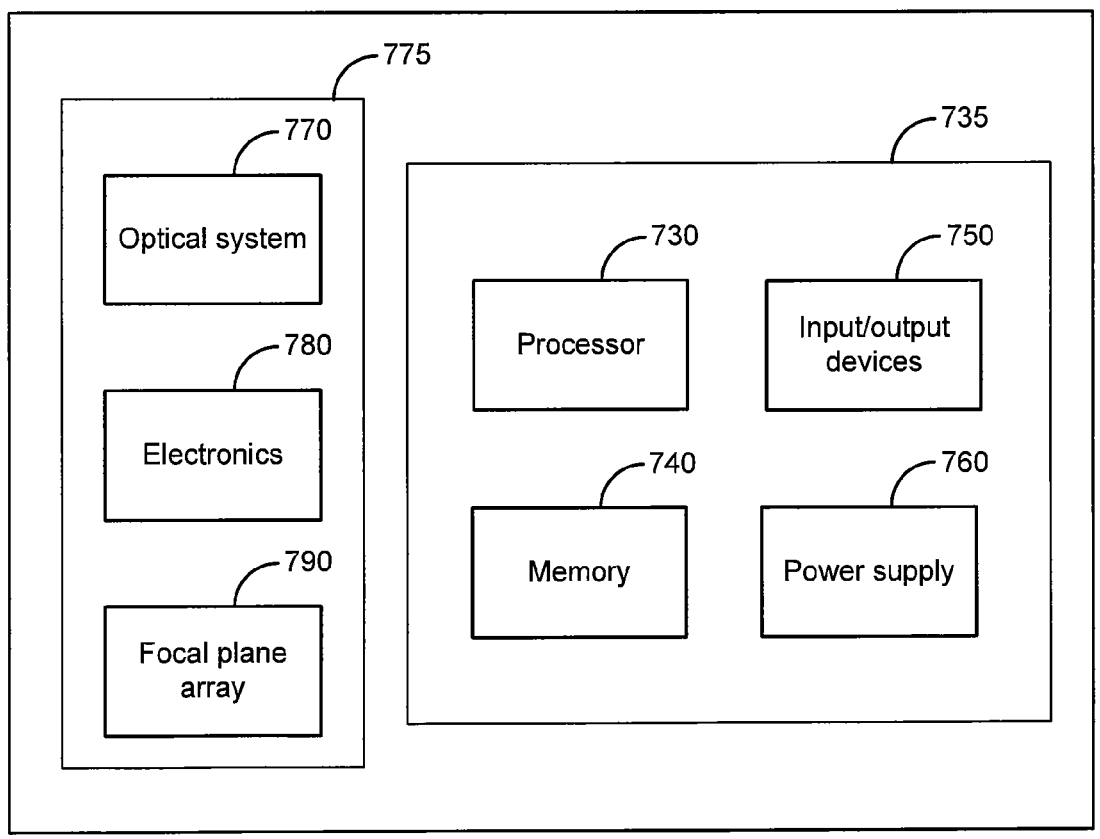
FIG. 7B shows a block diagram of a radiometric improvement system that characterizes the effects of optical scattering and/or pixel crosstalk for use during image processing, according to an embodiment of the disclosure.

FIG. 7B shows a block diagram 700B of a radiometric improvement system that characterizes the effects of optical scattering and/or pixel crosstalk for use during image processing, according to an embodiment of the disclosure. The radiometric improvement system 700B includes an imager 775 to be characterized and a processing system 735 for applying the correction filter to images taken by the imager 775. The imager 775 can include an optical system 770, electronics 780, and a focal plane array 790. The processing system 735 can include one or more processors 730, one or more memory units 740, input/output devices 750, and power supplies 760.

The optical system 770 includes any optical components used to image an object onto a focal plane array 790. Optical components in the optical system 770 can include, but are not limited to, lenses, mirrors, prisms, filters, and stops. The electronics 780 are used for sampling or scanning the focal plane array 790. The focal plane array 790 is an array of light-sensing pixels used for imaging. A non-limiting example of a focal plane array includes a micro-bolometer array.

A processor 730 can be used to run image processing applications such as applying a correction filter to one or more images. Memory units 740 can include, but are not limited to, RAM, ROM, and any combination of volatile and non-volatile memory. Memory units 740 can store coefficients for one or more filters and any other parameters used to calibrate or correct an imaging instrument such as gain and offset coefficients. Memory units 740 can also store image data. A power supply 760 can include, but is not limited to, a battery. An input/output device 750 can include, but is not limited to, triggers to start and stop the image processing system or to initiate other image processing functions, such as calibration or correction processes, visual displays, speakers, and communication devices that operate through wired or wireless communications.

Typically, processing system 735 is a part of the imager 775. However, the processing system 735 can be located external to the imager 775, thus the input/output device 750 can be used to communicate with one or more imaging instruments. Further, an external processing system 735 can store filter values for multiple imaging instruments, thus providing a central calibration service.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this patent application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

I claim:

1. A thermal imager, comprising:
   an optical system for thermal imaging;
   a focal plane array for capturing a thermal image imaged by the optical system, wherein the focal plane array comprises a plurality of pixels, and the thermal image comprises a plurality of values, wherein each of the plurality of values is associated with one of the pixels in the focal plane array; and
   a processor for applying a first spatial filter to the plurality of values to enhance object edge contrast in the thermal image.

2. The thermal imager of claim 1 wherein the first spatial filter comprises a plurality of first numerical coefficients that represent a first distribution of pixel cross-talk energy in a first section of the thermal image, and further wherein the first spatial filter is applied to enhance object edge contrast in the first section of the thermal images.

3. The thermal imager of claim 2 wherein the first numerical coefficients for the first spatial filter are determined by:
   capturing a test image of a target with the thermal imager, wherein the test image comprises a plurality of pixel test values;
   curve-fitting a first subset of the pixel test values in the first section of the test image to a first equation, wherein the first equation characterizes the first distribution of pixel cross-talk energy in the first section of the test image; and
   using the first equation to generate the first numerical coefficients as a function of their representative pixel positions within the first spatial filter.

4. The thermal imager of claim 3 wherein the first equation is selected from a first group consisting of a scattering dependence equation and a time-domain signal transfer dependence equation.

5. The thermal imager of claim 3, wherein the target has at least one skewed transition edge between two substantially uniformly illuminated areas, and the two areas have different illumination levels.

6. The thermal imager of claim 2 wherein the thermal imager causes the first section of the thermal image to have different properties from a second section of the thermal image, and further wherein the processor applies a plurality of second numerical coefficients for a second spatial filter to the plurality of values in the second section of the thermal image, wherein the second numerical coefficients represent a second distribution of pixel cross-talk energy in the second section of the thermal image and the second spatial filter is applied to enhance object edge contrast in the second section of the thermal image.

7. The imager of claim 6 wherein the second numerical coefficients for the second spatial filter are determined by:
   curve-fitting a second subset of the pixel test values in the second section of the test image to a second equation, wherein the second equation characterizes the second distribution of pixel cross-talk energy in the second section of the test image;
   using the second equation to generate the second numerical coefficients as a function of their representative pixel positions within the second spatial filter.

8. The imager of claim 7 wherein the second equation is selected from a second group consisting of a scattering dependence equation and a time-domain signal transfer dependence equation.

9. The thermal imager of claim 2, wherein the first section comprises an entire thermal image.

10. A thermal imager, comprising:
    means for thermal imaging;
    means for capturing a thermal image imaged by the means for thermal imaging, wherein the means for capturing a thermal image comprises a plurality of sub-components, and further wherein each thermal image comprises a plurality of values, wherein each of the plurality of values corresponds to one of the plurality of sub-components; and
    means for applying a spatial filter to the plurality of values to enhance object edge contrast in the thermal image.

11. The thermal imager of claim 10, wherein the spatial filter comprises a plurality of first numerical coefficients that represent a first distribution of pixel cross-talk energy in a first section of the thermal image, and further wherein the spatial filter is applied to enhance object edge contrast in the first section of the thermal image.

12. The thermal imager of claim 11, wherein the first numerical coefficients are determined by:

capturing a test image of a target with the thermal imager, wherein the test image comprises a plurality of pixel test values;

curve-fitting a first subset of the pixel test values in the first section of the test image to a first equation, wherein the first equation characterizes the first distribution of pixel cross-talk energy in the first section of the test image; and using the first equation to generate the first numerical coefficients as a function of their representative pixel positions within the spatial filter.

13. A thermal imager, comprising:

an optical system for thermal imaging;

a multi-element sensor for capturing a thermal image imaged by the optical system, wherein the thermal image comprises a plurality of values, and each of the plurality of values is associated with one of the elements in the multi-element sensor; and a memory containing a first spatial filter for applying to the plurality of values to enhance object edge contrast in the thermal image; and a transmission module for sending the thermal image and the first spatial filter to an external processor for correcting the thermal image using the first spatial filter.

14. The thermal imager of claim 13, wherein the transmission module wirelessly sends the thermal image and the first spatial filter to the external processor.

15. The thermal imager of claim 13, wherein the first spatial filter comprises a plurality of first numerical coefficients that represent a first distribution of pixel cross-talk energy in a first section of the thermal image, and further wherein the first spatial filter is applied to enhance object edge contrast in the first section of the thermal image.

16. The thermal imager of claim 15, wherein the first section comprises an entire thermal image.

17. The thermal imager of claim 15, wherein the first numerical coefficients are determined by:

capturing a test image of a target with the thermal imager, wherein the test image comprises a plurality of pixel test values;

curve-fitting a first subset of the pixel test values in the first section of the test image to a first equation, wherein the first equation characterizes the first distribution of pixel cross-talk energy in the first section of the test image; and using the first equation to generate the first numerical coefficients as a function of their representative pixel positions within the first spatial filter.

18. The thermal imager of claim 17, wherein the target has at least one skewed transition edge between two substantially uniformly illuminated areas, and the two areas have different illumination levels.

19. The thermal imager of claim 15, wherein the thermal imager causes the first section of the thermal images to have different properties from a second section of the thermal image, and further wherein the memory contains a plurality of second numerical coefficients for a second spatial filter to the plurality of values in the second section of the thermal image, wherein the second numerical coefficients represent a second distribution of pixel cross-talk energy in the second section of the thermal images and the second spatial filter is applied to enhance object edge contrast in the second section of the thermal image.

20. The thermal imager of claim 19, wherein the second numerical coefficients for the second spatial filter are determined by:

curve-fitting a second subset of the pixel test values in the second section of the test image to a second equation, wherein the second equation characterizes the second distribution of pixel cross-talk energy in the second section of the test image; and using the second equation to generate the second numerical coefficients as a function of their representative pixel positions within the second spatial filter.

21. The thermal imager of claim 13, wherein the memory further contains gain and offset calibration coefficients, and further wherein the transmission module further sends the gain and offset calibration coefficients to the external processor to be applied to the thermal image.

22. A system, comprising:

a receiver configured to receive a thermal image captured by a first thermal imager;

a processor configured to apply a first spatial filter to the thermal image to enhance object edge contrast in the thermal image, wherein the first spatial filter is associated with the first thermal imager.

23. The system of claim 22, wherein the first spatial filter is further associated with a family of thermal imagers having a similar system as the first thermal imager, and further wherein the first spatial filter is applied by the processor to other received thermal images captured by other members of the family of thermal imagers.

24. The system of claim 22, wherein the receiver is further configured to receive the spatial filter.

25. The system of claim 24, wherein the receiver receives the thermal image or the first spatial filter wirelessly.

26. The system of claim 22, further comprising a transmission module configured to transmit the filtered thermal image to an external device.

27. The system of claim 22, further comprising a memory for storing the first spatial filter.

28. The system of claim 22, wherein the first spatial filter comprises a plurality of first numerical coefficients that represent a first distribution of pixel cross-talk energy in a first section of the thermal image, and further wherein the first spatial filter is applied to enhance object edge contrast in the first section of the thermal image.

29. The system of claim 28, wherein the first numerical coefficients are determined by:

capturing a test image of a target with the first thermal imager, wherein the test image comprises a plurality of pixel test values;

curve-fitting a first subset of the pixel test values in the first section of the test image to a first equation, wherein the first equation characterizes the first distribution of pixel cross-talk energy in the first section of the test image; and using the first equation to generate the first numerical coefficients as a function of their representative pixel positions within the first spatial filter.

30. The system of claim 28, wherein the first thermal imager causes the first section of the thermal image to have different properties from a second section of the thermal image, and further wherein the processor applies a plurality of second numerical coefficients for a second spatial filter to the plurality of values in the second section of the thermal image, wherein the second numerical coefficients represent a second distribution of pixel cross-talk energy in the second section of the thermal image and the second spatial filter is applied to enhance object edge contrast in the second section of the thermal image, and wherein both the first spatial filter and the second spatial filter are associated with the first thermal imager.

31. The system of claim 30, wherein both the first spatial filter and the second spatial filter are further associated with a family of thermal imagers having a similar system as the first thermal imager, and further wherein the first spatial filter and the second spatial filter are applied by the processor to other received thermal images captured by other members of the family of thermal imagers.

32. A method, comprising:
receiving a thermal image captured by a first thermal imager;
applying a first spatial filter to the thermal image to enhance object edge contrast in the thermal image, wherein the first spatial filter is associated with the first thermal imager.

33. The method of claim 32, wherein the first spatial filter is further associated with a family of thermal imagers having a similar system as the first thermal imager, and further wherein the first spatial filter is applied by the processor to other received thermal images captured by other members of the family of thermal imagers.

34. The method of claim 32, further comprising receiving the first spatial filter.

35. The method of claim 32, further comprising receiving the thermal image or the first spatial filter wirelessly.

36. The method of claim 32, further comprising transmitting the filtered thermal image to an external device.

37. The method of claim 32, further comprising storing the first spatial filter.

38. The method of claim 32, wherein the first spatial filter comprises a plurality of first numerical coefficients that represent a first distribution of pixel cross-talk energy in a first section of the thermal image, and further wherein the first spatial filter is applied to enhance object edge contrast in the first section of the thermal image.

39. The method of claim 38, wherein the first numerical coefficients are determined by:
capturing a test image of a target with the first thermal imager, wherein the test image comprises a plurality of pixel test values;
curve-fitting a first subset of the pixel test values in the first section of the test image to a first equation, wherein the first equation characterizes the first distribution of pixel cross-talk energy in the first section of the test image; and
using the first equation to generate the first numerical coefficients as a function of their representative pixel positions within the first spatial filter.

40. The method of claim 38, wherein the first thermal imager causes the first section of the thermal image to have different properties from a second section of the thermal image, and further wherein the processor applies a plurality of second numerical coefficients for a second spatial filter to the plurality of values in the second section of the thermal image, wherein the second numerical coefficients represent a second distribution of pixel cross-talk energy in the second section of the thermal image and the second spatial filter is applied to enhance object edge contrast in the second section of the thermal image, and wherein both the first spatial filter and the second spatial filter are associated with the first thermal imager.

41. The method of claim 40, wherein both the first spatial filter and the second spatial filter are further associated with a family of thermal imagers having a similar system as the first thermal imager, and further wherein the first spatial filter and the second spatial filter are applied by the processor to other received thermal images captured by other members of the family of thermal imagers.

* * * * *